(12) United States Patent
Stevens

(10) Patent No.: US 8,210,456 B2
(45) Date of Patent: Jul. 3, 2012

(54) BATTERY RECYCLING

(76) Inventor: Wayne C. Stevens, Fenwick (CA)

( * ) Notice: Subject to any disclaimer, the term of this patent is extended or adjusted under 35 U.S.C. 154(b) by 0 days.

(21) Appl. No.: 12/923,957

(22) Filed: Oct. 18, 2010

(65) Prior Publication Data

US 2011/0031336 A1 Feb. 10, 2011

Related U.S. Application Data

(63) Continuation of application No. PCT/CA2009/001583, filed on Nov. 3, 2009.

(60) Provisional application No. 61/160,058, filed on Mar. 13, 2009.

(51) Int. Cl.
*B02C 11/08* (2006.01)
*B02C 21/00* (2006.01)

(52) U.S. Cl. ............ 241/19; 241/23; 241/24.14; 241/27

(58) Field of Classification Search .................... 241/23, 241/19, 20, 24.14, 24.15, 17, 27
See application file for complete search history.

(56) References Cited

U.S. PATENT DOCUMENTS

| | | | | | |
|---|---|---|---|---|---|
| 1,587,623 | A | * | 6/1926 | Zuckerman | 241/20 |
| 3,393,876 | A | * | 7/1968 | Elmore | 241/20 |
| 3,456,886 | A | * | 7/1969 | Tremolada | 241/5 |
| 3,493,183 | A | * | 2/1970 | Ebeling et al. | 241/24.15 |
| 3,777,994 | A | * | 12/1973 | Fischer | 241/20 |
| 3,892,563 | A | * | 7/1975 | La Point | 241/20 |
| 4,026,477 | A | * | 5/1977 | Tremolada | 241/17 |
| 4,384,683 | A | * | 5/1983 | Huwald et al. | 241/19 |
| 4,775,107 | A | * | 10/1988 | Heng et al. | 241/23 |
| 5,377,920 | A | * | 1/1995 | Alavi et al. | 241/17 |
| 5,575,907 | A | * | 11/1996 | Lindermann | 205/580 |
| 5,632,863 | A | * | 5/1997 | Meador | 201/25 |
| 5,707,015 | A | * | 1/1998 | Guthrie | 241/20 |

* cited by examiner

*Primary Examiner* — Bena Miller

(57) ABSTRACT

In a method of recycling sealed batteries, the batteries are shredded to form a shredded feedstock. The shredded feedstock is heated above ambient temperature and rolled to form a dried material. The dried material is screen separated into a coarse fraction and a powder fraction and the powder fraction is output. A system for recycling sealed cell batteries comprises an oven with a first conveyor extending into the oven. A rotatable tunnel extends within the oven from an output of the first conveyor. The tunnel has a spiral vane depending from its inner surface which extends along a length of the tunnel. A second conveyor is positioned below an output of the rotatable tunnel.

12 Claims, 4 Drawing Sheets

BATTERY RECYCLING

This application claims priority from previously filed PCT Patent Application No.: PCT/CA2009/001583, titled "BATTERY RECYCLING" filed on Nov. 3, 2009 by Wayne C. Stevens which claims priority from previously filed U.S. Provisional Patent Application No. 61/160,058, titled "BATTERY RECYCLING" filed on Mar. 13, 2009 by Wayne C. Stevens.

BACKGROUND

The present invention relates to a system and process for recycling sealed cell batteries.

Ninety-five percent of portable batteries are household batteries. The vast majority of these are sealed cell alkaline batteries. Once spent, most of these batteries are simply discarded and find their way to landfill sites.

A known method for recycling alkaline batteries involves mechanically removing the casing from the battery cell and then using chemical processes to separate the solid materials of the cell. Major solid components of the cells are carbon, zinc, potassium, and manganese. There are several problems with chemical separation processes. Firstly, the component materials involved are of low value while chemical processing is expensive. Also, additional waste streams are created with the chemical processes. In view of these drawbacks, this recycling method has not found widespread use.

This invention seeks to overcome drawbacks of known sealed cell battery recycling processes.

SUMMARY

In a method of recycling sealed batteries, the batteries are shredded to form a shredded feedstock. The shredded feedstock is heated above ambient temperature and rolled to form a dried material. The dried material is screen separating into a coarse fraction and a powder fraction and the powder fraction is output.

A system for recycling sealed cell batteries comprises an oven with a first conveyor extending into the oven. A rotatable tunnel extends within the oven from an output of the first conveyor. The tunnel has a spiral vane depending from its inner surface which extends along a length of the tunnel. A second conveyor is positioned below an output of the rotatable tunnel.

Other features and advantages will be apparent from the following description in conjunction with the drawings.

BRIEF DESCRIPTION OF THE DRAWINGS

In the figures which illustrate an example embodiment of the invention.

DETAILED DESCRIPTION

Technically, a battery is a series of battery cells. Thus, a 9 V battery is a true battery, whereas AAA through D size batteries are cells. In this specification, the term battery is used to mean either true batteries or cells.

The central core of an alkaline cylindrical button cell is the anode which is a dispersion of zinc oxide powder in a gel containing a potassium hydroxide electrolyte. This core is surrounded by a separator which is a non-woven layer of cellulose (paper) or a synthetic polymer (plastic). Surrounding the separator is an annular cathode which is a compressed paste of manganese dioxide with carbon (graphite) powder to increase conductivity. The anode, separator, and cathode are sealed in a drawn steel casing. Although some alkaline batteries are mercury-free, many spent alkaline batteries contain mercury, with an average overall concentration of 100 ppm.

Figure 1:
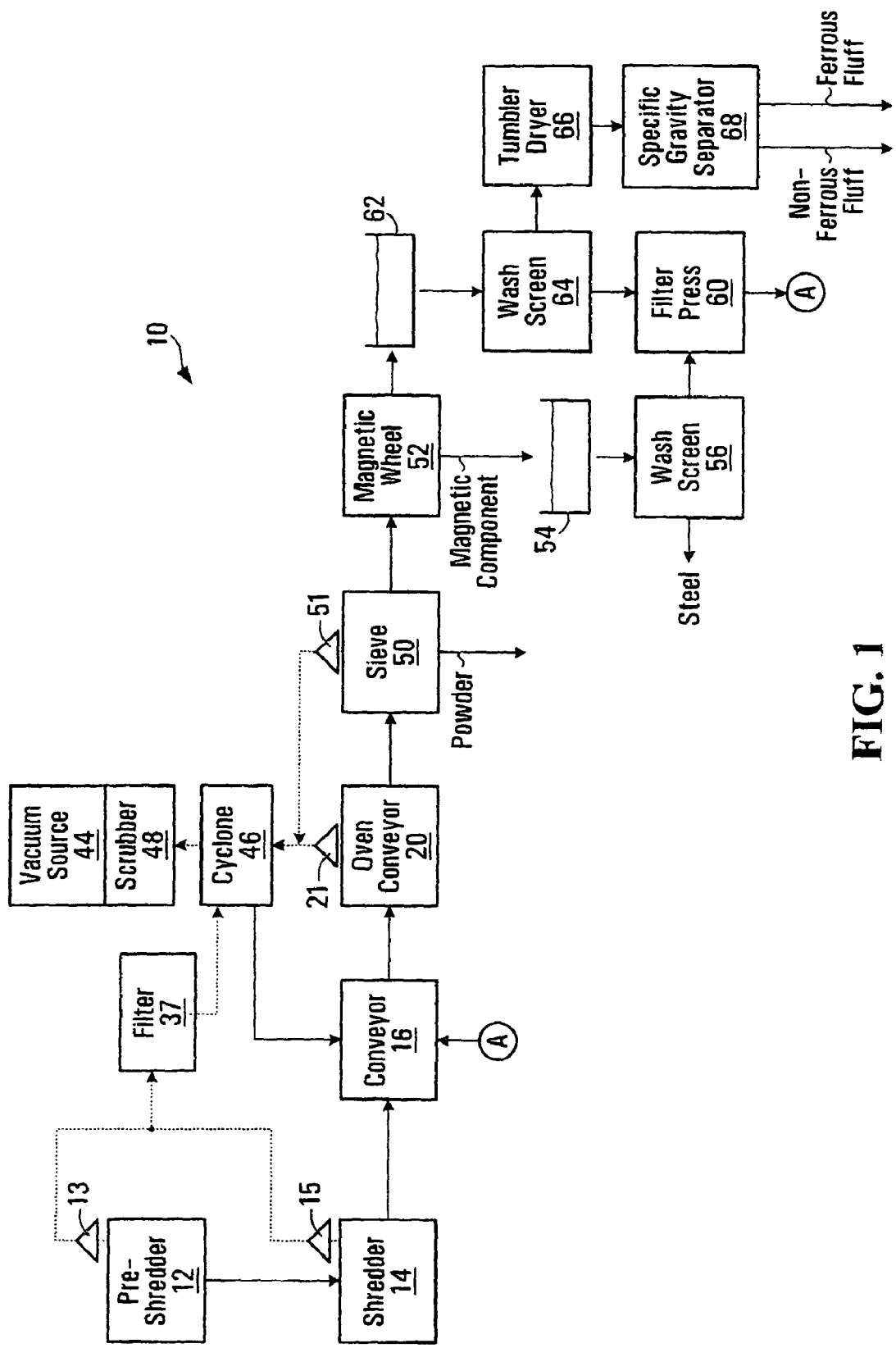
FIG. 1 is a schematic diagram of a system for battery recycling in accordance with this invention.

Turning to FIG. 1, a system 10 for recycling sealed cell alkaline batteries has a pre-shredder 12 for pre-shredding the feedstock in order to rupture their sealed steel casings. Next the batteries may be further shredded in secondary shredder 14, which may be a granulator, and are then conveyed downstream by conveyor 16. The conveyor, which may be a chain conveyor or a belt conveyor with flights, assists in breaking up the feedstock into a more uniform material feed stream.

Figure 2:
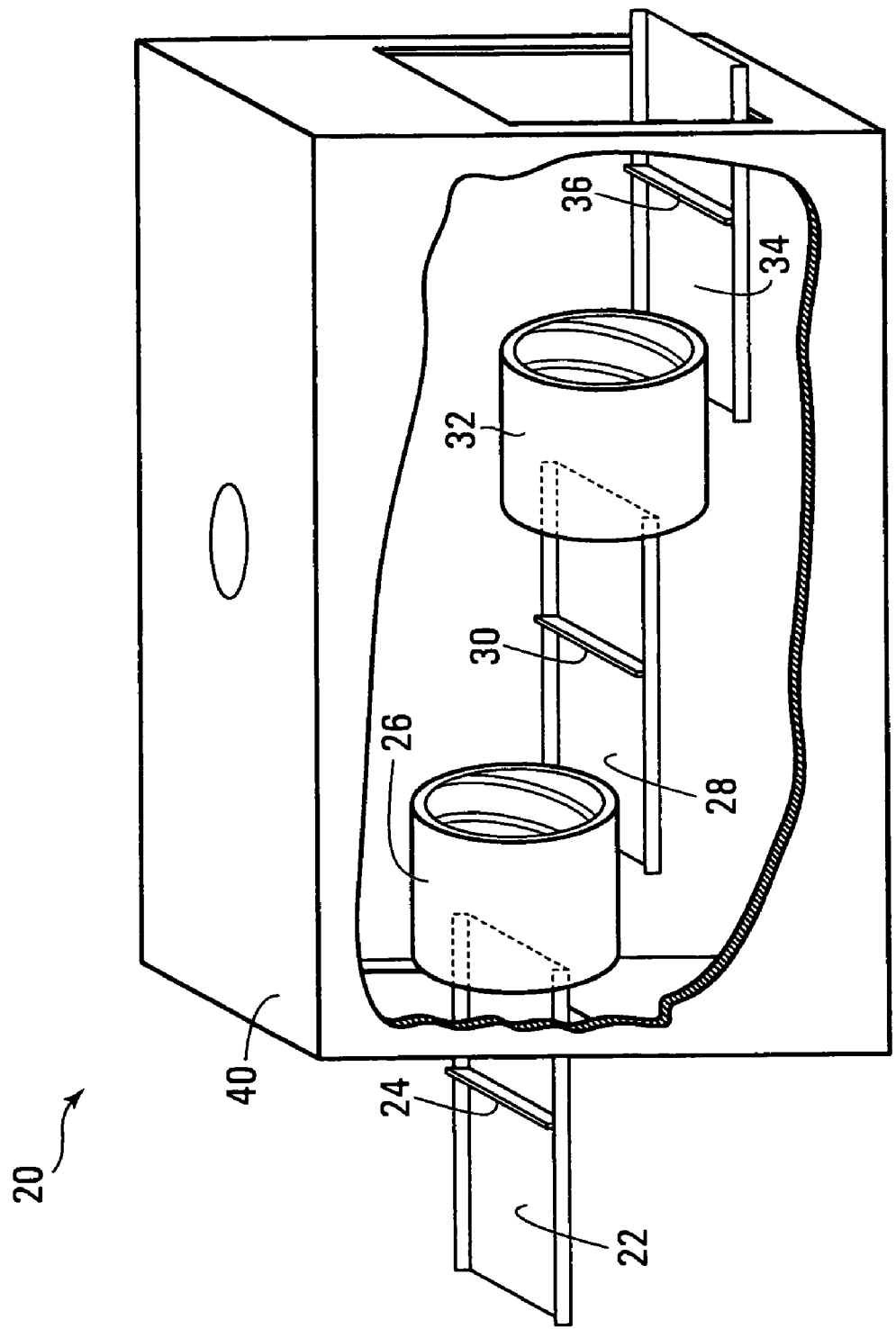
FIG. 2 is a partially cut-away perspective view of a portion of the system of FIG. 1.

From the conveyor 16, the feedstock passes to an oven conveyor 20. The oven conveyor 20 is detailed in FIG. 2. Turning to FIG. 2, oven conveyor 20 has an input belt conveyor 22 with an overlying blade 24 which levels the feedstock. The input belt conveyor dispenses to an upstream screw tunnel 26. The upstream screw tunnel 26 has a spiral vane depending from its inner surface that extends along the length of the tunnel. The upstream screw tunnel 26 rotates to roll the feedstock. The upstream screw tunnel 26 in turn dispenses to a middle belt conveyor 28 with an overlying blade 30 which levels the feedstock. The middle belt conveyor dispenses to a downstream screw tunnel 32 having a similar configuration as the upstream screw tunnel. The downstream screw tunnel dispenses to an output belt conveyor 34. The output belt conveyor has an overlying blade 36 which levels the feedstock. An oven 40 surrounds all but the upstream end of the input belt conveyor and downstream end of the output belt conveyor.

Feedstock traveling on the input belt conveyor 22 is levelled by blade 24. The material then drops into upstream screw tunnel 26. This screw tunnel rotates to roll the feedstock and feed it downstream. At the downstream end of the upstream screw tunnel, the feedstock drops to the middle belt conveyor 28 where it is levelled by blade 30 and conveyed into downstream screw tunnel 32. The downstream screw tunnel rotates to roll the feedstock and convey it to output belt conveyor 34, where the feedstock is levelled by blade 36 and then dispensed from the oven conveyor.

By repeatedly conveying, rolling and levelling the feedstock at elevated temperatures in the oven conveyor, the feedstock is dried and evaporation of mercury in the feedstock is promoted.

Returning to FIG. 1, there are air uptakes 13, 15, 21, and 51 associated with each of pre-shredder 12, shredder 14, oven conveyer 20 and a sieve 50, respectively. Each of the air uptakes feed ultimately to a cyclone 46, with air uptakes 13 and 15 feeding to the cyclone through a particulate filter 37. A vacuum source 44 draws air through the cyclone 46 to a scrubber 48 before the air leaves the system 10. The cyclone swirls the moving air to drop out any powder or other solids entrained in the moving air. The scrubber sequesters vapours in the moving air which, with the alkaline battery feedstock, will be mercury vapours. The scrubber 48 may be a venturi scrubber with a pH control system that ensures the solubility of vapours. It may also be any other type known in the art to be effective in these conditions. With a venturi scrubber, the scrubber itself acts as the vacuum source. Filter 37 traps any paper and plastics drawn off by air intakes 13 and 15 so that the scrubber is not obstructed by this material and so that any fire that develops in the scrubber is not additionally fed by these paper and plastics.

While mercury has a boiling point of about 357° C. (about 675° F.), it is nevertheless volatile even at room temperature and therefore off gases at the various air uptakes as well as off gassing strongly in the oven conveyor.

Feedstock leaving the oven conveyor passes to a sieve 50 which may be a shaker table with a mesh size #30. This separates a coarser fraction of the feedstock from a finer fraction. The mesh size is such that the finer fraction which drops through the sieve is a zinc oxide, manganese dioxide, and potassium hydroxide powder. This powder is recovered as a finished product of the process.

The coarser fraction, which comprise the shredded steel casing along with brass, cellulose (paper), graphite (carbon), and plastic, collectively known as fluff, pass to a magnetic separator 52, which may be a magnetic wheel.

The separated steel (magnetic component) is immersed in a first water bath 54. Water from the bath 54 drains through a wash screen 56. Any remaining powder will pass through the screen and therefore remain in the water. Larger solids, namely the separated steel, are blocked by the screen and are washed off the screen to recover the steel as a second finished product of the process.

The water which passes through the screen 56 passes on to filter press 60.

The non-magnetic component of the fluff which is separated by the magnetic separator is immersed in a second water bath 62. Water from the bath 62 drains through a wash screen 64. Any remaining powder in the water will pass through the screen with the water. Larger solids, namely the fluff, are blocked by the screen and are washed off the screen. This fluff passes to a tumbler dryer 66 where it is dried and then to a specific gravity separator 68. The specific gravity separator may be of the forced air type known in the art. The specific gravity separator 68 separates the ferrous component of the fluff (graphite and brass) from the nonferrous component (paper and plastic). These two output streams are finished products of the process.

The water which passes through screen 64 passes on to filter press 60.

The water passing to the filter press from screens 56 and 64 passes through the membranes of the filter press such that any powder which had been in the water is recovered as a wet powder. This wet powder is fed back to the conveyor 16 in the system 10. The water, which at this stage is normally caustic, then passes to a holding tank (not shown) wherein its pH is adjusted so that it may be reused in the water baths.

The recovered powder of zinc oxide, manganese dioxide, and potassium hydroxide may be used in fertilizer provided its mercury content has been sufficiently reduced. In this regard, typically, a powder with a mercury content of less than 75 ppm is suitable for use in fertilizer. With the subject system, mercury concentrations down to undetectable levels may be achieved.

The recovered steel may be used in the steel industry. The recovered paper and plastic from the fluff may be burned for energy (e.g., in oven 40).

The same process described for alkaline batteries may also be used for any of zinc carbon, zinc chloride, and manganese batteries. The composition of the recovered powder will vary somewhat depending upon the type of battery which forms the feedstock. However, for all of these types of batteries, the recovered powder may be used in fertilizer.

The time during which the feedstock remains in the oven conveyor and the temperature of this conveyor are determined based on characteristics of the feedstock and desired properties of the powder output from the system. More specifically, a customer of the powder may specify a required dryness and mercury content for the powder. Characteristics of the feedstock which impact the required heating time and temperature are the size of the battery cells, the age of the cells (newer batteries need to be run slower at higher temperatures), mercury content, and the type of battery. Regardless of customer requirements, the feedstock must at least be sufficiently dry so that it separates at the screen separator sieve 50.

While the temperature of the oven can be varied as required, typically, a temperature of between a low temperature of 300° F. and a high temperature of 800° F. is sufficient where the feedstock remains in the oven conveyor for 1 to 10 minutes. The speed of the conveyors determines the time in the oven conveyor. By way of example only one minute in the oven conveyor may correspond to a high speed whereas ten minutes in the oven conveyor may correspond to a low speed.

For example, for a mixed feedstock of alkaline, zinc carbon, zinc chloride, and manganese batteries and a 26 ft long oven conveyor, the speed through the oven conveyor may be 2.6 ft/min and the temperature may be set at 800° F.

The mesh size of the screen separator can be varied as required provided it is sufficiently small to separate the powder fraction of the feedstock. However, a #30 mesh size is suitable where the powder is to be used in the fertilizer industry and also allows the powder to pelletize well.

Figure 3:
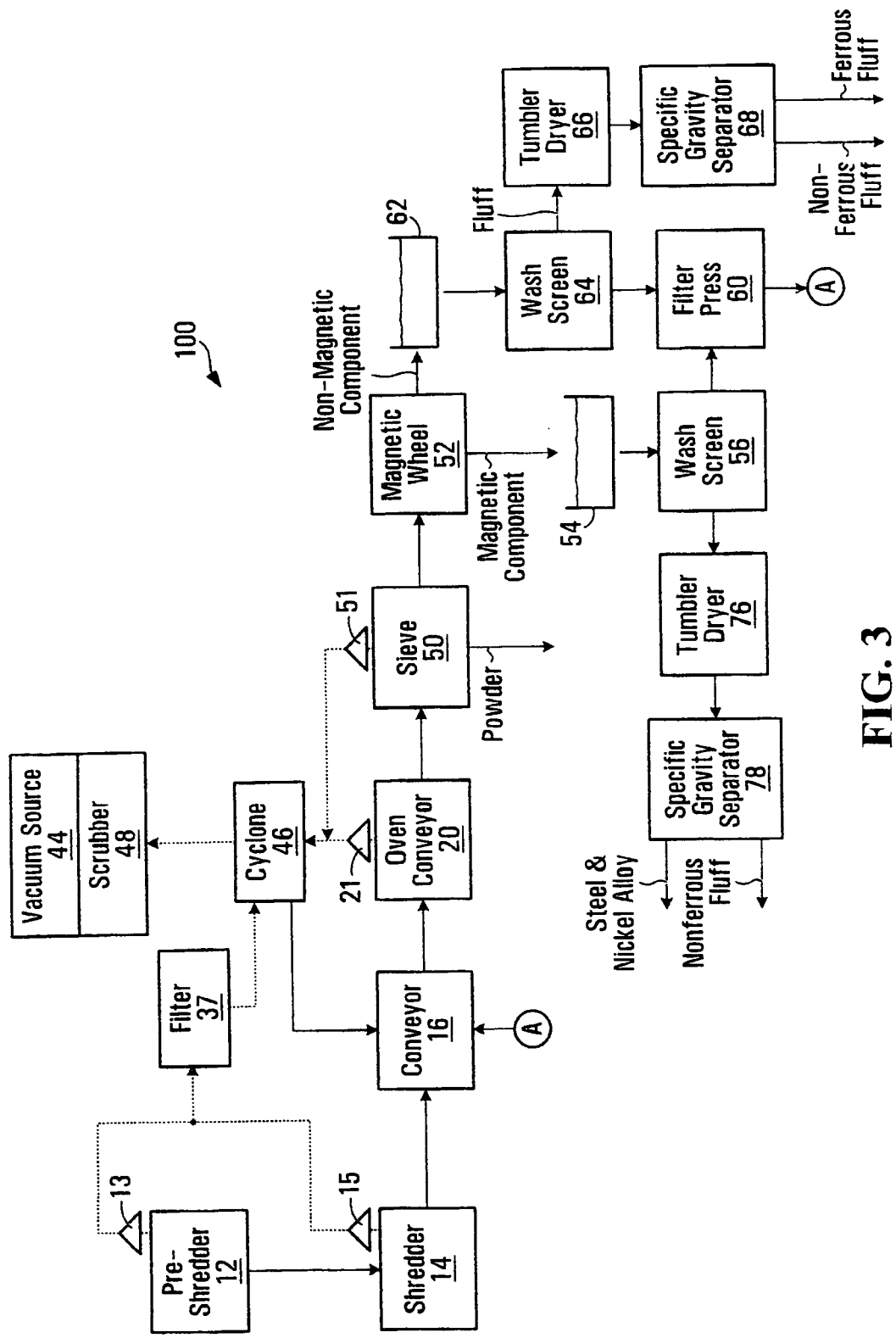
FIG. 3 is a schematic diagram of another system for battery recycling in accordance with this invention.

The described system may be modified for use with nickel metal hydride sealed cell batteries. More specifically, turning to FIG. 3, system 100 for use with a feedstock of nickel metal hydride batteries is with some exceptions the same as system 10 of FIG. 1, and like parts have been given like reference numerals. The differences are as follows. System 100 includes a tumbler dryer 76 at the output of the first wash screen 56 which feeds to a specific gravity separator 78.

With nickel metal hydride batteries, the anode is nickel oxyhydroxide and the cathode is most commonly a lanthanoid mixture with nickel, cobalt, manganese, and/or aluminum. Some cathodes may include other metals, such as iron or chromium. The electrolyte is most commonly potassium hydroxide.

The processing of nickel metal hydride batteries in system 100 proceeds identically to the processing of alkaline batteries in system 10 of FIG. 1 except as follows. Vapours generated from drying the feedstock are water and volatile organic compounds (VOCs). The speed of the oven conveyor is adjusted so that the feedstock dries sufficiently through the oven conveyor at the chosen oven temperature. The scrubber (which may be a venturi scrubber as used in the system 10 of FIG. 1) sequesters the vapours from the drying process.

When the feedstock leaves the oven conveyor and reaches the sieve, the powder component which passes through the sieve comprises nickel oxyhydroxide powder, cobalt oxide, and lanthanoids. As when operating with alkaline batteries, sieve 50 may have a #30 mesh size. The recovered powder may be used in the coatings industry for pigmentation or the powder may be used in the stainless steel industry.

The solid component, which does not pass through the sieve, contains steel, fluff and nickel alloys. These nickel alloys include iron. The steel and nickel alloys form the magnetic component which is separated from the fluff by the magnetic wheel 52. However, the nickel alloys of this magnetic component typically encapsulate some of the fluff as a consequence of the upstream shredding process. This encapsulated fluff remains with the magnetic component leaving the magnetic wheel. The magnetic component is directed through bath 54 to the first wash screen 56. The solid component leaving the wash screen passes to tumbler dryer 76 where it is dried. The dried solid component then inputs specific gravity separator 78 to separate nonferrous fluff residues from the nickel alloys and to separate the nickel alloys from the steel. The steel and nickel alloys are finished products that may be used in the steel industry.

System 100 may be modified to operate with a feedstock of lithium button cells, namely lithium ion batteries, which are rechargeable, or lithium polymer batteries. With a lithium battery, the anode is a lithium metal or lithium compound. The cathode is, most commonly, manganese dioxide and the electrolyte is, most commonly, lithium perchlorate in propylene carbonate and dimethoxyethane.

Figure 4:
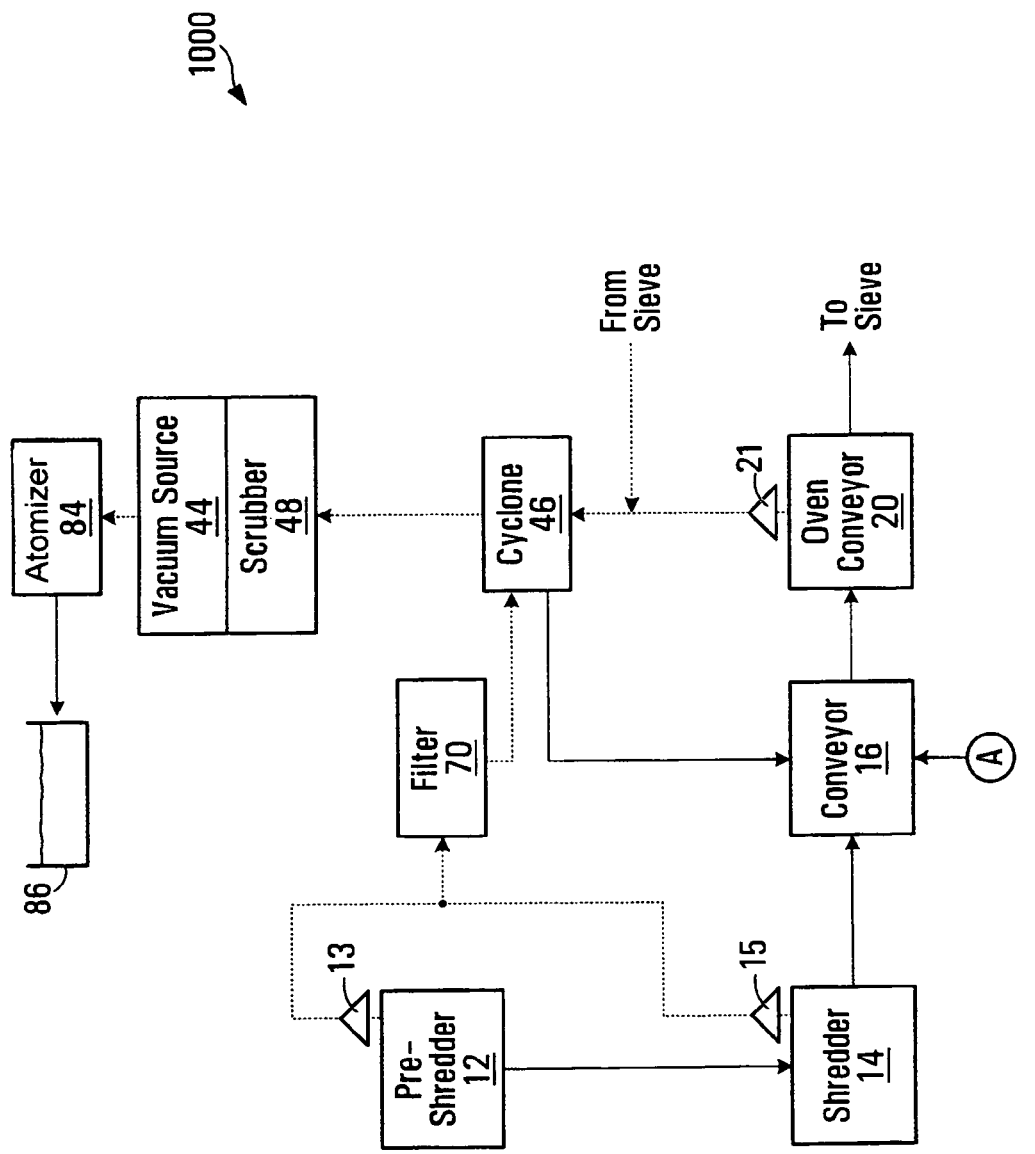
FIG. 4 is a schematic diagram of a portion of another system for battery recycling in accordance with this invention.

FIG. 4 illustrates a portion of a system 1000 for use with lithium button cells. System 1000 is identical to system 100 of FIG. 3 except as follows. The scrubber 48 outputs to a water atomizer 84 and the atomizer 84 outputs to a tank 86. These modifications are employed because of the highly combustible nature of lithium and the volatile organic compounds (VOCs) in the batteries.

In this modified system, when the lithium batteries are shredded and conveyed by the conveyor, lithium, which gas off at any of the air pick up points and pass to the scrubber 48 where they are sequestered. Any lithium or VOCs which escape the scrubber are condensed by the atomized water from the atomizer 84 and the condensed lithium passes to the water tank 86. The pH of the water in the atomizer and the tank is controlled with, for example, the addition of sodium hydroxide to a concentration of 50%, to ensure the gas remains condensed in the water. Any paper drawn off or drawn off is trapped by filter 70 before it reaches the scrubber so that it will not feed any fire that might occur at the scrubber or obstruct the scrubber. Because of the risk of combustion with lithium ion battery feedstock, the temperature in the oven conveyor is maintained below the combustion temperature of paper (454° F.).

With lithium button cells, at the sieve 50, the powder which drops out is mostly lithium cobalt oxide. This powder can be used in the coatings industry. As before, a mesh size #30 is suitable to limit contamination of this powder.

The magnetic component separated by the magnetic wheel includes steel and magnetic alloys as well as any aluminum and copper that is trapped by the steel and magnetic alloys. The specific gravity separator 78 (FIG. 3) separates out non-ferrous fluff encapsulated with this magnetic component and also separates the steel, magnetic alloys, aluminum, and copper from each other.

In general, with system 10 run with alkaline batteries, the oven conveyor is run at a low speed and high temperature (to promote evaporation of mercury), with system 1000 run with lithium batteries, the oven conveyor is run at a mid speed and temperature (to avoid combustion), and when the system 100 is run with nickel metal hydride batteries, the oven conveyor is run at high speeds and temperatures.

While three different systems have been described, they may be combined in a single system and components of that system switched in or out, or on or off, as appropriate, to adapt the system to the different kinds of feedstock.

Rather than providing a vacuum source to draw vapours into the scrubber, blowers could be used for this purpose.

There is a minimal amount of paper and light plastics released with the shredding of alkaline batteries. Accordingly, optionally, filter 37 may be omitted when running system 10.

Other modifications will be apparent to those skilled in the art and, therefore, the invention is defined in the claims.

What is claimed is:

1. A method of recycling sealed batteries, comprising:
   shredding said batteries to form a shredded feedstock;
   heating said shredded feedstock above ambient temperature and below the boiling point of mercury while rolling said shredded feedstock to form a dried material;
   screen separating said dried material into a coarse fraction and a powder fraction;
   and outputting said powder fraction;
   wherein said batteries are alkaline batteries containing mercury, said heating while rolling evaporates a portion of said mercury from said feedstock, and wherein said powder fraction comprises zinc oxide, manganese dioxide, and potassium hydroxide.

2. The method of claim 1 further comprising drawing air through said shredded material during said heating and rolling to draw off mercury vapour from said shredded feedstock.

3. The method of claim 2 further comprising sequestering said mercury in a scrubber.

4. The method of claim 3 further comprising swirling said air drawn from said shredded material to drop out any particulates from said air and returning said particulates to said shredded material.

5. The method of claim 1 further comprising magnetically separating said coarse fraction into a magnetic component and a non-magnetic component.

6. A method of recycling sealed batteries, the batteries selected from the group consisting of alkaline batteries, zinc carbon batteries, zinc chloride batteries, manganese batteries nickel metal hydride batteries the method comprising
   shredding said batteries to form a shredded feedstock;
   heating said shredded feedstock above ambient temperature while rolling said shredded feedstock to form a dried material;
   screen separating said dried material into a coarse fraction and a powder fraction;
   and outputting said powder fraction;
   further comprising magnetically separating said coarse fraction into a magnetic component and a non-magnetic component;
   further comprising immersing said magnetic component in a first water bath and passing water from said first water bath through a screen to separate magnetic solids, and outputting said magnetic solids.

7. The method of claim 6 further comprising separating said magnetic solids based on their specific gravity prior to said outputting said magnetic solids and wherein said outputting said magnetic solids comprises outputting separated constituents of said magnetic solids.

8. The method of claim 6 further comprising immersing said non-magnetic component in a second water bath and passing water from said second water bath through a screen to separate fluff, and outputting said fluff.

9. The method of claim 8 further comprising separating said fluff based on specific gravity of constituents of said fluff prior to said outputting said fluff and wherein said outputting said fluff comprises outputting separated constituents of said fluff.

10. The method of claim 8 further comprising combining water from said first water bath and said second water bath as a water component and filtering said water component to recover a powder component.

11. The method of claim 10 further comprising adding said powder component to said shredded material.

12. A method of recycling sealed batteries containing mercury, comprising:
    shredding said batteries to form a shredded feedstock;
    heating said shredded feedstock above ambient temperature and below the boiling point of mercury while rolling said shredded feedstock to evaporate a portion of said mercury from said feedstock to form a mercury reduced dried material;
    screen separating said dried material into a coarse fraction and a powder fraction; and
    outputting said powder fraction.

* * * * *